United States Patent
Mukasa

(10) Patent No.: US 6,574,405 B2
(45) Date of Patent: Jun. 3, 2003

(54) OPTICAL FIBER AND OPTICAL TRANSMISSION LINE USING THIS OPTICAL FIBER

(75) Inventor: Kazunori Mukasa, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 47 days.

(21) Appl. No.: 09/941,670

(22) Filed: Aug. 30, 2001

(65) Prior Publication Data

US 2002/0051611 A1 May 2, 2002

(30) Foreign Application Priority Data

Sep. 1, 2000 (JP) .......................... 2000-266086

(51) Int. Cl.⁷ .................... G02B 6/02; G02B 6/16; G02B 6/18; G02B 6/22
(52) U.S. Cl. ................ 385/123; 385/124; 385/127
(58) Field of Search .................. 385/123, 127, 385/124, 125, 126

(56) References Cited

U.S. PATENT DOCUMENTS

| | | | | |
|---|---|---|---|---|
| 5,673,354 A | * | 9/1997 | Akasaka et al. | 385/127 |
| 5,999,679 A | * | 12/1999 | Antos et al. | 385/127 |
| 6,178,279 B1 | * | 1/2001 | Mukasa et al. | 385/123 |
| 6,349,163 B1 | * | 2/2002 | Antos et al. | 385/127 |
| 6,404,967 B2 | * | 6/2002 | Arai et al. | 385/126 |
| 6,421,490 B1 | * | 7/2002 | Liu | 385/127 |
| 6,445,864 B2 | * | 9/2002 | Jiang et al. | 385/127 |

OTHER PUBLICATIONS

Kazunori Mukasa, et al., "Dispersion–Managed Transmission Lines with Reverse–Dispersion Fiber", Furukawa Review, 2000, No. 19, pp 5–9.

U.S. patent application Ser. No. 09/878,976, filed Jun. 13, 2001.

* cited by examiner

Primary Examiner—John D. Lee
Assistant Examiner—Tina M Lin
(74) Attorney, Agent, or Firm—Oblon, Spivak, McClelland, Maier & Neustadt, P.C.

(57) ABSTRACT

The invention provides an optical fiber suitable for an optical transmission line for controlling the dispersion of a total line such that this dispersion is approximately zero by combining plural optical fibers. As one example, in the optical fiber having a refractive index profile structure of four layers, a relative refractive index difference Δ1 of a center core with respect to a clad is set to 0.75% or more and 0.90% or less, and dispersion at a wavelength of 1.55 μm is set to −18 ps/nm/km or more and −8 ps/nm/km or less, and an effective core section area $A_{eff}$ at the wavelength of 1.55 μm is set to 32 μm² or more.

12 Claims, 3 Drawing Sheets

Prior Art

US 6,574,405 B2

OPTICAL FIBER AND OPTICAL TRANSMISSION LINE USING THIS OPTICAL FIBER

FIELD OF THE INVENTION

The present invention relates to an optical fiber suitable for wavelength division multiplexing (WDM) transmission and an optical transmission line using this optical fiber in at least one portion.

BACKGROUND OF THE INVENTION

As high speed and large capacity of optical transmission is advanced, a wavelength division multiplexing (WDM) transmission technique is noticed as a key technique. However, a non-linear phenomenon caused by high input signal power or signal interactions is discussed as a new problem.

Among the non-linear phenomena, four-wave mixing (FWM) has a serious influence on the WDM transmission. Therefore, a restraining method of the four-wave mixing is vigorously studied. Since the FWM is caused with small dispersion, it is known that an optical fiber with small dispersion in a transmission wavelength band, e.g., a dispersion shifted fiber (DSF) is disadvantageous in this respect.

Further, signal distortion due to self phase modulation (SPM) and cross phase modulation (XPM) is a very serious problem. A solution of such problems is researched and reported in OFC '97 TuN1b, etc. These reports show that the enlargement of an effective core area ($A_{eff}$) as well as reducing a non-linear refractive index difference ($n_2$) is very useful.

SUMMARY OF THE INVENTION

The present invention provides an optical fiber for restraining the non-linear phenomenon and an optical transmission line using this optical fiber. The invention resides in an optical fiber comprising:

a negative dispersion value in a range of −18 ps/nm/km or more and −8 ps/nm/km or less in at least one portion within a wavelength range from 1500 nm to 1650 nm, and a negative dispersion slope;

a refractive index profile structure of n-layers (n is an integer of 4 or more) sequentially arranged in an order of a first layer, a second layer, a third layer, - - - from an inner side;

a relative refractive index difference (Δ1) of the first layer set to 0.75% or more and 0.90% or less in a state in which cladding layer of the refractive index profile is set to a reference; and an effective core section area set to 32 $\mu m^2$ or more at a wavelength of 1550 nm.

BRIEF DESCRIPTION OF THE DRAWINGS

Exemplary embodiments of the invention will now be described in conjunction with drawings in which.

DETAILED DESCRIPTION

Figure 1:
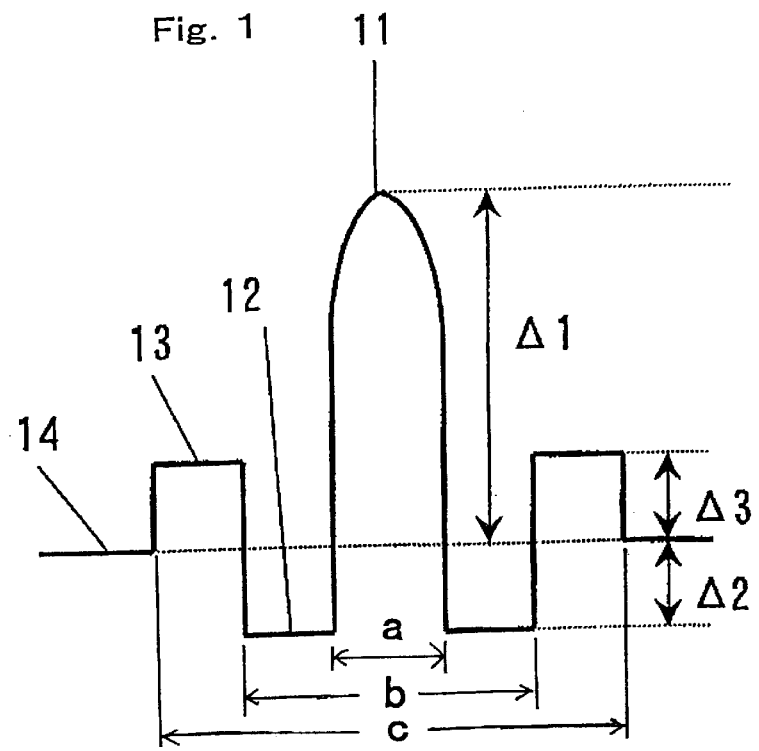
FIG. 1 is an explanatory view showing a refractive index profile structure of an optical fiber in a first embodiment of the invention.

Signal distortion $\phi_{NL}$ due to a non-linear phenomenon is generally represented by the following formula.

$$\phi_{NL} = (2\pi \times n_2 \times L_{eff} \times P)/(\lambda \times A_{eff})$$

Here, $L_{eff}$, λ and P respectively show an effective optical fiber length, a signal wavelength and signal power.

As mentioned above, it is advantageous to set $A_{eff}$ to be large so as to restrain the signal distortion due to the non-linear phenomenon. As reported in OFC '96 WK 15 and OFC '97 TuN2, the enlargement of $A_{eff}$ is one of most required characteristics. However, it is known that problems of an increase in bending loss, an increase in dispersion slope, etc. are easily caused in the enlargement of $A_{eff}$ when a transmission line is constructed by a simple fiber as in the DSF of a conventional type. This also holds true with respect to an optical fiber (a non-zero dispersion shifted fiber (NZ-DSF)), etc. having very small dispersion in a transmission band.

To solve the above problems, it is proposed that a method for controlling dispersion in a total line is effective. For example, a patent application (laid-open No. 42102/1996) laid-open in Japan shows that a preferable optical transmission line is obtained when the optical transmission line is connected from lower non-linear fiber to higher one from the transmitter and each optical fiber having dispersion values of positive and negative reverse signs. The optical fiber having positive dispersion generally has low non-linearity in comparison with the optical fiber having negative dispersion.

As shown in ECOC '97 Vol. 1 P127, a single mode fiber (SMF) having a zero dispersion wavelength near 1.3 μm in wavelength and a reverse dispersion fiber (RDF) having reverse dispersion characteristics are proposed as concrete examples. The SMF and the RDF have a large dispersion value of about 16 to 25 ps/nm/km in absolute value in a wavelength of 1550 nm so that it is advantageous in view of FWM restriction.

However, there is a possibility that large accumulated dispersion cause the signal distortion at a high-bit-rate transmission even though dispersion is compensated in a total line. In contrast to this, the NZ-DSF having dispersion about ±2 to 6 ps/nm/km has relatively small so that FWM can not be avoided.

Therefore, a positive dispersion optical fiber having an absolute dispersion value larger than that of the NZ-DSF and a dispersion smaller than that of the conventional SMF is recently proposed as proposed by e.g., the present inventors in Japanese Patent Application (Application No. 234767/1999).

However, no optimal optical fiber exists with respect to the optical fiber of the negative dispersion for controlling the dispersion of the total optical transmission line in combination with the positive dispersion optical fiber.

Concretely, the NZ-DSF approximately having a very small dispersion from −6 to −2 ps/nm/km, and the RDF approximately having a negative dispersion from −16 to −25 ps/nm/km near 1.55 μm in wavelength also have problems as mentioned above. Further, $A_{eff}$ of the RDF generally approximately ranges from 20 to 25 $\mu m^2$, and signal distortion can not be neglected.

The conventional SMF has a dispersion from 15 to 20 ps/nm/km in a 1.55 $\mu m$ band. Therefore, when optical transmission is performed in the 1.55 $\mu m$ band, distortion of the signal waveform due to the dispersion is caused. A technique for inserting (connecting) a negative optical fiber at a subsequent stage and controlling the dispersion is effective to restrain the distortion of this signal waveform.

Therefore, it is conventionally studied that the DCF used as a module is assembled into an optical cable, etc. and used as a transmission line. However, The DCF of the conventional type generally has a large refractive index of core so that $A_{eff}$ is reduced and non-linear refractive index ($n_2$) is increased. Therefore, the non-linear phenomenon is very easily caused. Further, there are many cases in which transmission loss becomes a relatively large value such as 0.3 dB/km or more, and polarization mode dispersion (PMD) also becomes a relatively large value such as 0.2 $ps/km^{1/2}$ or more. Further, the conventional DCF has a very large dispersion value so that signal distortion due to accumulating dispersion is caused especially for the high-bit-rate transmission.

Therefore, a cabling type dispersion compensating optical fiber (reverse dispersion fiber (RDF)) having reverse dispersion characteristics is recently proposed as a dispersion compensating fiber of a cabling type for restraining local dispersion to a small value. In this RDF, $A_{eff}$ approximately ranges from 20 to 25 $\mu m^2$, and transmission loss is about 0.24 dB/km, and PMD is 0.1 $ps/km^{1/2}$ or less so that the RDF has excellent characteristics as the dispersion compensating optical fiber.

However, these RDFs also have a relatively large dispersion from −16 to −25 ps/nm/km. Therefore, there is a possibility that an obstacle due to large accumulating dispersion is caused at a high bit-rate transmission even though the dispersion is totally controlled. Further, since $A_{eff}$ approximately ranges from 20 to 25 $\mu^2$, there is also a case in which the non-linear phenomenon becomes a problem.

Therefore, the present inventors have considered that an optical fiber of the negative dispersion having an absolute value of dispersion smaller than that of the RDF (18 ps/nm/km or less, preferably 16 ps/nm/km or less) in a wavelength band of 1.55 $\mu m$ is necessary. In this case, since the conventional NZ-DSF has the problem of generation of the FWM, it is necessary to set the absolute value of dispersion to 8 ps/nm/km or more.

However, even when the signal distortion due to the dispersion and the FWM is restrained, the signal distortion due to XPM and SPM is easily caused when $A_{eff}$ of the optical fiber is small. Since these non-linear phenomena are notable in strong optical power, a lower nonlinear positive dispersion optical fiber (SMF, etc.) is generally arranged after an optical amplifier in a dispersion management transmission line. Thereafter, a high nonlinear negative dispersion fiber (RDF, etc.) in comparison with the optical fiber at the previous stage is inserted in a signal weakening portion.

Accordingly, light incident to the negative dispersion optical fiber of dispersion management transmission line is decreased by propagating the positive dispersion optical fiber. However, $A_{eff}$ of the RDF approximately ranges from 20 to 25 $\mu m^2$, and $A_{eff}$ of the DCF is 20 $\mu m^2$ or less. Accordingly, both the fibers do not have enough $A_{eff}$ sufficiently large to restrain the non-linear phenomenon. Further, when the dispersion value of the negative dispersion fiber is reduced, a length (stripe length ratio) of the positive dispersion fiber is correspondingly shortened (in other words, the length of the negative dispersion fiber is lengthened). It becomes very important to set the negative dispersion fiber to have low non-linearity.

Figure 5:
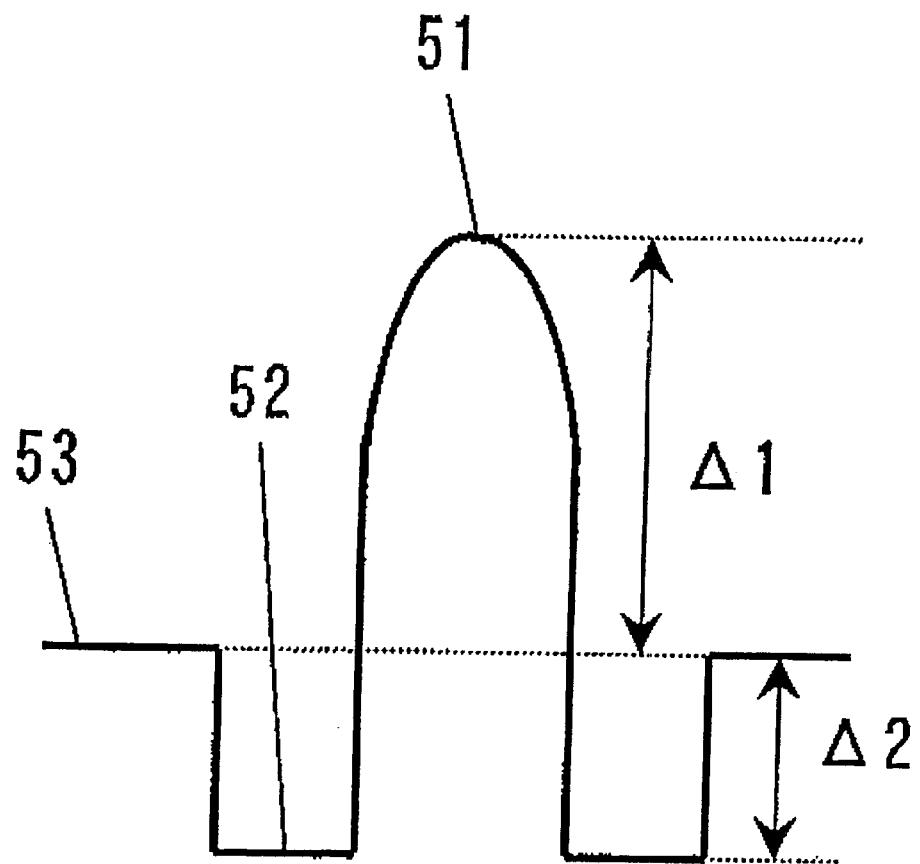
FIG. 5 is an explanatory view showing one example of the refractive index profile structure of a conventional optical fiber.

FIG. 5 shows one example of the negative dispersion fiber having a refractive index profile structure of a three-layer type often considered in the past. In FIG. 5, reference numerals 51, 52 and 53 respectively designate a first layer, a second layer and a third layer. The third layer 53 is set to an outermost layer relative to propagation of light. A relative refractive index difference of the first layer 51 with respect to the third layer 53 is set to Δ1, and a relative refractive index difference of the second layer 52 with respect to the third layer 53 is set to Δ2. In this specification, a value of the relative refractive index difference in each layer is shown in a state in which an outermost layer (normally a clad layer) of the refractive index profile structure relative to the propagation of light is set to a reference.

However, it is not preferable to optimize the negative dispersion optical fiber by using the refractive index profile structure of the three-layer type shown in FIG. 5 since a dispersion compensating rate and bending loss characteristics are generally deteriorated. Therefore, the present inventors have considered optimization of the negative dispersion optical fiber by the refractive index profile structure of a four-layer type.

FIG. 1 shows the refractive index profile structure of an optical fiber in a first embodiment of the invention. In FIG. 1, reference numerals 11, 12, 13 and 14 respectively designate a first layer, a second layer, a third layer and a fourth layer. The fourth layer 14 is set to an outermost layer (here a clad layer) exerting an influence on the propagation of light. An outside diameter of the first layer 11 is set to a, and an outside diameter of the second layer 12 is set to b, and an outside diameter of the third layer 13 is set to c. A relative refractive index difference of the first layer 11 with respect to the fourth layer 14 is set to Δ1, and a relative refractive index difference of the second layer 12 with respect to the fourth layer 14 is set to Δ2, and a relative refractive index difference of the third layer 13 with respect to the fourth layer 14 is set to Δ3.

The refractive index profile structure shown in FIG. 1 has an affect of preventing bending loss increase by particularly arranging the third layer 13 having a refractive index higher than that of the fourth layer 14 inside the fourth layer 14. Therefore, this structure is said to be an effective refractive index profile structure for improving bending loss characteristics while preferable dispersion characteristics are obtained.

Therefore, a combination of a, b, c, Δ1, Δ2 and Δ3 is optimized by using this refractive index profile structure of FIG. 1.

First, the value of Δ2 considered to be a most important element is optimized in the determination of a dispersion value of the optical fiber. When the absolute value of Δ2 is increased by constantly setting the other conditions, it is known that a high compensating rate is obtained without increasing a cutoff wavelength. However, when this absolute value is too large, the bending loss tends to be increased.

Therefore, the values of Δ1 of several kinds are set, and a change in characteristics is considered with respect to the value of each Δ1 when Δ3 and an outside diameter ratio a:b:c are constantly set and Δ2 is changed. Here, since low non-linearity is particularly noticed, the consideration is mainly taken into account when Δ1 is small and $A_{eff}$ becomes large.

As one example, Table 1 shows the change in characteristics with respect to the value of Δ2 when Δ1 is fixedly set to 0.9% and Δ3 is fixedly set to 0.25%. In this case, a value DPS (DPS=dispersion value/dispersion slope) obtained by dividing a dispersion value by a dispersion slope is fixedly set to 300 nm, and the ratio a:b:c is adjusted such that $A_{eff}$, the cutoff wavelength (λc), the dispersion value, etc. are optimum values at that time. Here, the value of the DSP is an index showing the height of a dispersion compensating rate with respect to the positive dispersion optical fiber. The DPS value is generally about 300 in the case of a conventional SMF, and is about 250 in the case of a small dispersion SMF (a dispersion value of about 10 ps/nm/km). Accordingly, it is desirable that the DPS value is at least 400 or less and preferably approximately ranges from 250 to 300.

TABLE 1

| Δ2 % | dispersion value ps/nm/km | DPS nm | $A_{eff}$ μm² | λc nm | β/k |
|---|---|---|---|---|---|
| −0.25 | −6.3 | 300 | 34.5 | 1720 | 1.44699 |
| −0.30 | −10.0 | 300 | 33.6 | 1639 | 1.44676 |
| −0.35 | −14.2 | 300 | 32.7 | 1575 | 1.44653 |
| −0.40 | −17.4 | 300 | 32.0 | 1503 | 1.44643 |
| −0.45 | −19.5 | 300 | 30.9 | 1480 | 1.44533 |

In the table 1, β/K shows a propagation index coefficient. The propagation index coefficient is one index showing goodness of a propagating state of light and is desirably set to 1.44600 or more. As can be seen from the table 1, it is necessary to set the value of Δ2 to range from about −0.40% to −0.35% so as to sufficiently reduce the non-linear phenomenon ($A_{eff}$ is 32 μm² or more) and perform a single mode operation near 1.55 μm in wavelength (λc is 1600 nm or less) while the condition of a dispersion value from −8 to −18 ps/nm/km is satisfied. Further, it should be understood in view of the relation of a value of Δ2/Δ2 that a value of about −0.45 to −0.38 is an optimum value.

Next, the change in characteristics is examined when the value of Δ2 is fixedly set to the above optimum value, and Δ3 is changed with respect to Δ1 of several kinds. The outside diameter ratio a:b:c is finely adjusted and again adjusted such that the compensating rate is close to 100%. As one example, Table 2 shows the change in characteristics when Δ1=0.85% and Δ2=−0.35% are set and Δ3 is changed. As can be seen from the table 2, it should be understood that a value near Δ3=0.20 to 0.25% is an optimum value.

TABLE 2

| Δ3 % | dispersion value ps/nm/km | DPS nm | $A_{eff}$ μm² | λc nm | β/k |
|---|---|---|---|---|---|
| 0.15 | −7.1 | 300 | 30.9 | 1305 | 1.44632 |
| 0.20 | −10.9 | 300 | 31.9 | 1462 | 1.44649 |
| 0.25 | −14.2 | 300 | 32.7 | 1575 | 1.44653 |
| 0.30 | −17.1 | 300 | 33.0 | 1690 | 1.44664 |
| 0.35 | −19.4 | 300 | 34.3 | 1793 | 1.44674 |

Further, such a change in characteristics is examined with respect to Δ1 of several kinds, and an optimum profile with respect to each Δ1 is calculated.

$A_{eff}$ is generally enlarged by reducing Δ1, but the bending loss is increased. Here, a range from 0.75 to 0.90% is determined as Δ1 having a possibility that range from −18 to −8 ps/nm/km is satisfied at a wavelength of 1550 nm and the non-linear phenomenon is sufficiently reduced ($A_{eff}$ is 32 μm² or more) keeping small bending loss (a propagation refractive index β/K of 1.44600 or more). It has been found that the bending loss is increased when Δ1 is smaller than this range, and the enlargement of $A_{eff}$ is insufficient when Δ1 is greater than this range. As a result of the consideration of an optimum value of Δ2 with respect to each Δ1, it has been found that Δ2/Δ1 is −0.3 or less and Δ2 ranges from −0.45% to 0.30% and Δ3 ranges from 0.10% to 0.30% as optimum ranges.

In this case, the value of the outside diameter ratio a:b:c is adjusted to set the value of the DPS in a wavelength band of 1.55 μm to 300 or less. However, when the value of a ratio a:b ranges from 1:1.6 to 1:2.0, the DPS becomes 300 or less so that high compensating rate will be obtained when it's connected with positive dispersion fiber.

When no value of a:b ranges from 1:1.6 to 1:2.0, it has been found that the compensating rate becomes worse when the value of b is reduced, and the cutoff wavelength λc is very increased when the value of b is increased.

When the value of a ratio a:c is set to range from 1:2.1 to 1:3.2 in a state satisfying the range from 1:1.6 to 1:2.0 with respect to the value of a:b, no bending loss is damaged and the cutoff wavelength is held at 1550 nm or less while the high compensating rate is maintained. Therefore, the outside diameter ratio (a:b:c) is set to 1:(1.6 to 2.0):(2.1 to 3.2).

As a result of the above consideration, it has been found that it is preferable to set Δ1 to range from 0.75% to 0.90%, and set Δ2/Δ1 to −0.3 or less, and set Δ2 to range from −0.45% to −0.30%, and set Δ3 to range from 0.10% to 0.30%, and set the ratio a:b:c to 1:(1.6 to 2.0):(2.1 to 3.2).

A low nonlinear optical fiber is obtained by adopting the above refractive index profile structure of a four-layer type. Next, the present inventors have further considered a five-layer structure as an optical fiber having a separate refractive index profile structure.

Figure 2:
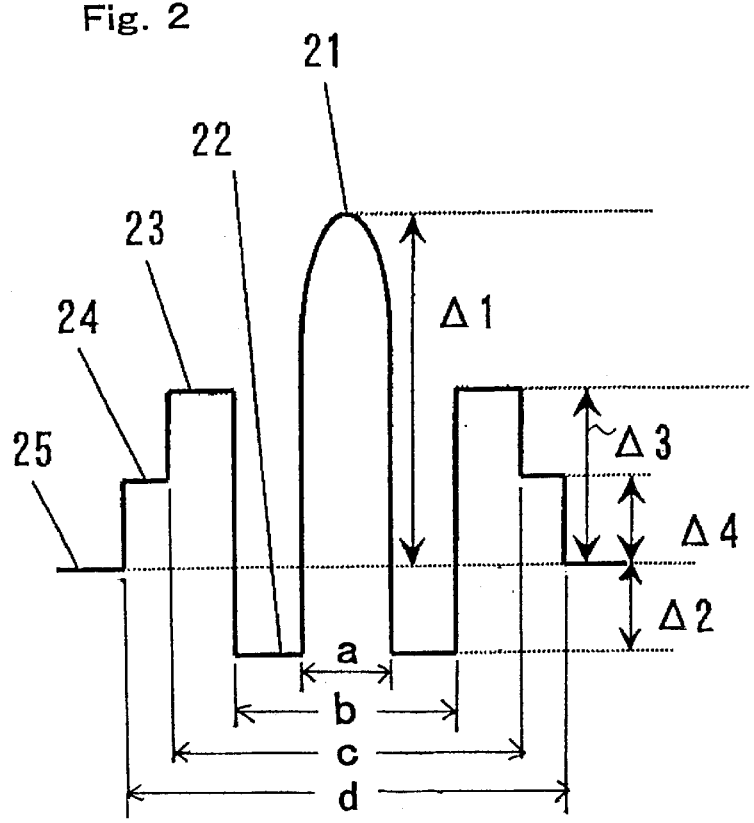
FIG. 2 is an explanatory view showing a refractive index profile structure of an optical fiber in a second embodiment of the invention.
Figure 3:
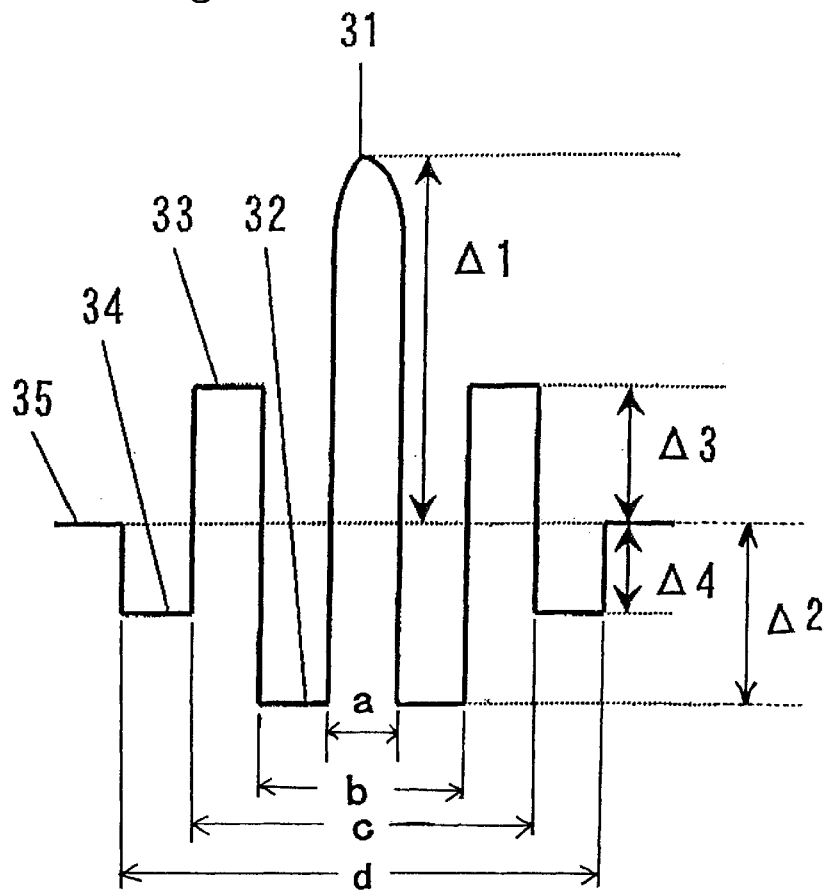
FIG. 3 is an explanatory view showing a refractive index profile structure of an optical fiber in a third embodiment of the invention.

Each of second and third embodiments of the invention relates to an optical fiber having the refractive index profile structure of five layers. FIG. 2 shows the refractive index profile structure of an optical fiber of the second embodiment. FIG. 3 shows the refractive index profile structure of an optical fiber of the third embodiment. In FIG. 2 showing the second embodiment, reference numerals 21, 22, 23, 24 and 25 respectively designate a first layer, a second layer, a third layer, a fourth layer and a fifth layer. The fifth layer 25 is an outermost layer (here a clad layer) exerting an influence on the propagation of light. An outside diameter of the first layer 21 is a, and an outside diameter of the second layer 22 is b, and an outside diameter of the third layer 23 is c, and an outside diameter of the fourth layer 24 is d. A relative refractive index difference of the first layer 21 with respect to the fifth layer 25 is Δ1, and a relative refractive index difference of the second layer 22 with respect to the fifth layer 25 is Δ2, and a relative refractive index difference of the third layer 23 with respect to the fifth layer 25 is Δ3, and a relative refractive index difference of the fourth layer 24 with respect to the fifth layer 25 is Δ4. Here, Δ4>0 is set.

In FIG. 3 showing the third embodiment, reference numerals 31, 32, 33, 34 and 35 respectively designate a first layer, a second layer, a third layer, a fourth layer and a fifth layer. The fifth layer 35 is an outermost layer (here a clad layer) exerting an influence on the propagation of light. An outside diameter of the first layer 31 is a, and an outside diameter of the second layer 32 is b, and an outside diameter of the third layer 33 is c, and an outside diameter of the fourth layer 34 is d. A relative refractive index difference of the first layer 31 with respect to the fifth layer 35 is Δ1, and a relative refractive index difference of the second layer 32 with respect to the fifth layer 35 is Δ2, and a relative refractive index difference of the third layer 33 with respect to the fifth layer 35 is Δ3, and a relative refractive index difference of the fourth layer 34 with respect to the fifth layer 35 is Δ4. Here, Δ4<0 is set.

A simulation consideration is taken with respect to the refractive index profile structures of FIGS. 2 and 3. First, when Δ4 is positive and is 0.05 or less, it has been found that the dispersion compensating rate is a small value such as 60% or less even when d is adjusted. In contrast to this, when Δ4 is 0.2% or more, it has been found that λc becomes 1600 nm or more and the bending loss is increased. Here, when the outside diameter ratio is adjusted such that the dispersion compensating rate is improved and the cutoff wavelength is 1600 nm or less, it has been found that a:b:c:d=1:(1.6 to 2.2):(2.3 to 2.8):(2.8 to 4.3) is formed.

Similarly, characteristics are considered when Δ4 is set to a negative relative refractive index difference. Table 3 shows a change in characteristics when Δ1 is 0.80%, Δ2 is –0.40%, Δ3 is 0.25%, and a:b:c=1:1.85:2.7 is set and the outside diameter of the fourth layer 34 is set to d=3a and d=4a. Here, dispersion is set to about –14 ps/nm/km.

TABLE 3

| d | Δ4 % | dispersion value ps/nm/km | DPS nm | $A_{eff}$ $\mu m^2$ | λc nm | β/k |
|---|---|---|---|---|---|---|
| 0 | 0 | –14.0 | 278 | 33.2 | 1555 | 1.44630 |
| 3.0 | –0.05 | –14.0 | 332 | 32.9 | 1405 | 1.44621 |
| 3.0 | –0.15 | –13.9 | 398 | 32.6 | 1262 | 1.44609 |
| 3.0 | –0.25 | –14.2 | 483 | 32.4 | 1075 | 1.44589 |
| 4.0 | –0.05 | –14.1 | 375 | 32.6 | 1290 | 1.44614 |
| 4.0 | –0.15 | –13.9 | 478 | 32.3 | 1036 | 1.44598 |
| 4.0 | –0.25 | –14.0 | 530 | 32.0 | 915 | 1.44567 |

From the table 3, it is possible to sufficiently shorten λc without greatly damaging $A_{eff}$ by adding the fourth layer 34 of Δ4<0. However, there is a case in which bad influences are caused by adding the fourth layer 34 of Δ4<0. In these bad influences, the DPS becomes worse and it becomes weak in the bending loss, etc. It has been found that Δ4 must be set to –0.15% or more to avoid such bad influences.

Here, when Δ4 is lower than –0.15%, it has been found that the DPS is 400 or more and the bending loss is 20 dB/m or more even when the outside diameter ratio is adjusted. It has been also found that it is sufficient to set Δ4 to –0.05% or less to sufficiently shorten λc.

Further, it has been found that it is possible to hold the other characteristics by adjusting the outside diameter ratio a:b:c:d while λc is sufficiently shortened. Similar to the case of the second embodiment, it is possible to set a:b:c:d=1:(1.6 to 2.2):(2.3 to 2.8):(2.8 to 4.3) as one adjusting example of this outside diameter ratio a:b:c:d.

The negative dispersion optical fiber shown in each of the first to third embodiments has low non-linearity and low bending loss characteristics. A high compensating rate is obtained when the negative dispersion optical fiber shown in each of the first to third embodiments is connected to an SMF and other positive dispersion optical fibers at suitable lengths. The optical fiber of each embodiment has an intermediate dispersion value between the conventional RDF and the NZ-DSF. Accordingly, it is known that a negative dispersion optical fiber near an ideal of a new type can have been realized.

As mentioned above, the present inventors have developed the negative dispersion optical fiber of a new type this time. This developed optical fiber has intermediate dispersion characteristics of the RDF and the NZ-DSF, and simultaneously achieves low non-linearity (restriction of FWM, SPM, XPM, etc.) and a high compensating rate and low bending loss characteristics with respect to SMF and other positive dispersion optical fibers. An optical transmission line connecting this negative dispersion optical fiber to an optical fiber having positive dispersion and a positive dispersion slope has characteristics of low non-linearity, a low bending loss and a low dispersion slope, and is optimal as a WDM optical transmission line.

The optical transmission line of a new type constructed by using the positive dispersion optical fiber and this new type negative dispersion optical fiber is a transmission line which is suitable for the future's WDM transmission. Thus, it has become possible to easily manufacture a transmission line path suitable for high bit rate and high capacity transmission of these high characteristics.

Effectiveness of the invention will next be confirmed by performing the actual sample fabrication of the optical fiber based on the above simulation results. First, the fabrication for obtaining the negative dispersion optical fiber is performed by using the refractive index profile structure of FIG. 1 corresponding to the first embodiment. Table 4 shows results of the fabrication performed with reference to the simulation results.

TABLE 4

| No. | Δ1 % | loss dB/km | dispersion value ps/nm/km | slope ps/nm²/ km | DPS nm | $A_{eff}$ $\mu m^2$ | λc nm | bending loss dB/m |
|---|---|---|---|---|---|---|---|---|
| 41 | 0.85 | 0.22 | –15.3 | –0.04 | 383 | 34.0 | 1498 | 7 |
| 42 | 0.85 | 0.21 | –13.2 | –0.05 | 264 | 32.4 | 1456 | 3 |

In the fabricated optical fiber shown in the table 4, $A_{eff}$ is 32 $\mu m^2$ or more in both cases, and is sufficiently enlarged in comparison with the conventional DCF ($A_{eff}$ is about 20 $\mu m^2$) and the RDF ($A_{eff}$ is about 24 $\mu m^2$).

Further, since the relative refractive index difference of a center core is small, the value of a transmission loss is relatively small. Further, since the dispersion value in a wavelength band of 1.55 $\mu m$ is sufficiently large, the restriction of a signal noise due to the FWM can be expected. Since the dispersion slope is negative, a positive dispersion slope can be compensated, and other characteristics such as the bending loss, etc. also preferable.

Next, some fabrications are also performed with reference to the simulation results with respect to the refractive index profile structure of FIG. 2. Table 5 shows results of the fabrications.

TABLE 5

| No. | Δ1 % | loss dB/ km | dispersion value ps/nm/km | dispersion slope ps/nm²/km | DPS nm | $A_{eff}$ $\mu m^2$ | λc nm | bending loss dB/m |
|---|---|---|---|---|---|---|---|---|
| 51 | 0.75 | 0.24 | –14.2 | –0.04 | 355 | 40.3 | 1432 | 15 |
| 52 | 0.80 | 0.24 | –14.9 | –0.07 | 213 | 34.3 | 1257 | 14 |

As can be seen from this table, the characteristics of $A_{eff}$ and the dispersion compensating rate can be further improved by using the fifth-layer structure. The bending loss is slightly a large value, but is restrained to a level able to be sufficiently practically used.

Subsequently, some fabrications are also performed with reference to the simulation results with respect to the refractive index profile structure of FIG. 3. Table 6 shows results of these fabrications.

TABLE 6

| No. | Δ1 % | loss dB/km | dispersion value ps/nm/km | dispersion slope ps/nm²/km | DPS nm | $A_{eff}$ $\mu m^2$ | λc nm | bending loss dB/m |
|---|---|---|---|---|---|---|---|---|
| 61 | 0.80 | 0.24 | −14.0 | −0.04 | 350 | 37.3 | 1032 | 10 |
| 62 | 0.85 | 0.24 | −12.9 | −0.04 | 322 | 36.3 | 1157 | 12 |

As shown in the table 6, very preferable results balanced in $A_{eff}$ and the dispersion compensating rate are obtained. Further, the bending loss is restrained to a relatively small level, and stable characteristics can be confirmed.

As mentioned above, when the optical fiber of this embodiment is connected to the SMF or a positive dispersion optical fiber similar to this SMF, low dispersion can be obtained in a wide wavelength range as a result. It should be further understood that $A_{eff}$ is a large value such as 32 $\mu m^2$ or more and low non-linearity is achieved. Further, the bending loss is restrained to a low level since the relative refractive index difference Δ1 of the first layer is set to be low in comparison with that of the conventional negative dispersion optical fiber. Further, an obtained value of the PMD is lower than a value (0.1 ps/km$^{1/2}$) set to be usable in high density WDM optical transmission.

An optical transmission line using the optical fiber of the invention will next be explained. This optical transmission line is constructed by including one or plural optical fibers having positive dispersion and a positive dispersion slope in at least one portion within a wavelength range from 1500 nm to 1650 nm, and one or plural optical fibers as shown in each of the embodiments of the invention.

In one embodiment of the optical transmission line using the optical fiber of the invention, the optical fibers are sequentially arranged in the order of low non-linearity from an optical transmitter to an optical receiver. Since the positive dispersion optical fiber generally has low non-linearity in comparison with the negative dispersion optical fiber, it is desirable to use the optical fiber of the invention in a portion near the optical receiver side.

Figure 4:
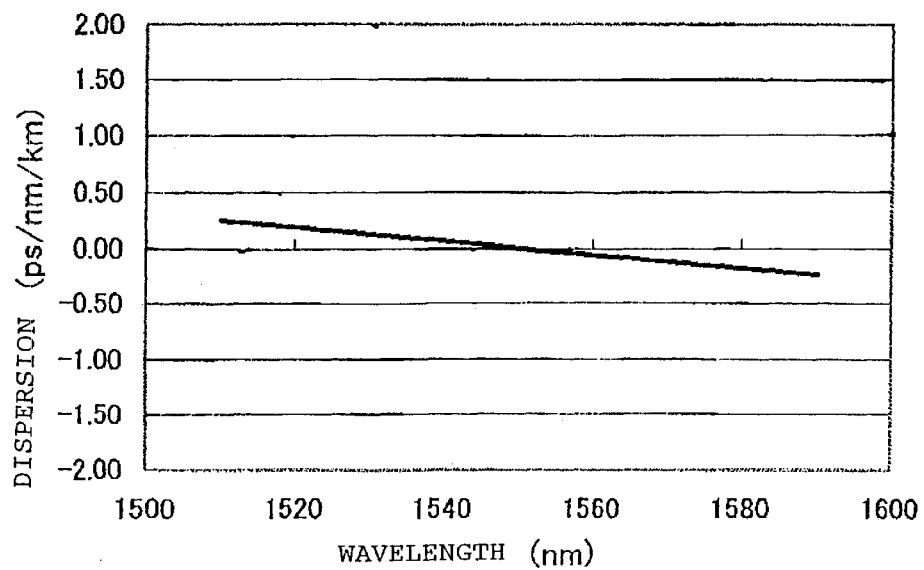
FIG. 4 is an explanatory view showing the results of wavelength vs. dispersion characteristics of an optical transmission line using the optical fiber in one embodiment of the invention.

One concrete example of the optical transmission line in the invention will be explained here. The optical transmission line is constructed by connecting the optical fiber of No. 42 of the table 4 and the conventional type SMF (the dispersion value at a wavelength of 1550 nm is about 16.5 ps/nm/km, and the dispersion slope is about 0.055 ps/nm²/km). The dispersion in the entire line path is set to approximately zero at the wavelength of 1550 nm. FIG. 4 shows the results of wavelength vs. dispersion characteristics at this time.

As can be seen from FIG. 4, the dispersion after the connection is 0.5 ps/nm/km or less at least at a wavelength from 1520 to 1580 nm, and it is confirmed that this dispersion lies at a sufficiently practical level. Further, it is confirmed that non-linearity in the total line, etc. are preferable in comparison with the optical transmission line using the conventional optical fiber.

As explained above, it is possible to provide an optical fiber and an optical transmission line suitable for the WDM optical transmission by the invention. However, the optical fiber and the optical transmission line of the invention are not limited to the above embodiments, but other various modes can be adopted.

For example, in the optical fibers of the embodiments, the PMD is set to 0.1 ps/km$^{1/2}$ or less, but this value is realized only by optimization of the refractive index profile structure. There are a technique (Japanese Patent Laid-Open No. 171970/1994) for twisting the optical fiber during a drawing process of the optical fiber, etc. as a technique for reducing the PMD of the optical fiber. However, it is considered that the PMD can be further reduced by applying such a technique in the future.

With respect to the optical transmission line using the optical fiber of the invention, the conventional type SMF is used as the positive dispersion optical fiber connected to the optical fiber of the invention in the above explanation of the embodiments. However, for example, an optical fiber proposed by the present inventors in Japanese Patent Application (Application No. 234767/1999) may be also used. Further, an optical fiber of NZ-DSF, etc. may be included within the optical transmission line.

Namely, in the optical transmission line constructed by connecting plural optical fibers in series, at least one or plural optical fibers of the invention are used within one or plural optical fibers having negative dispersion and a negative dispersion slope so that performance of the entire optical transmission line can be improved.

As mentioned above, it is possible to easily construct a low nonlinear WDM transmission line having both dispersion flatness and low non-linearity with respect to SPM, XPM, FWM, etc., and particularly suitable for high bit rate and high capacity transmission by applying the optical fiber of one example of the invention.

What is claimed is:

1. An optical fiber comprising:
 a negative dispersion value in a range of −18 ps/nm/km or more and −8 ps/nm/km or less in at least one portion within a wavelength range from 1500 nm to 1650 nm, and a negative dispersion slope;
 a refractive index profile structure of n-layers (n is an integer of 4 or more) sequentially arranged in an order of a first layer, a second layer, a third layer, - - - from an inner side;
 a relative refractive index difference Δ1 of the first layer set to 0.75% or more and 0.90% or less in a state in which an outermost layer of the refractive index profile structure relative to optical propagating characteristics is set to a reference; and
 an effective core section area set to 32 $\mu m^2$ or more at a wavelength of 1550 nm.

2. An optical fiber according to claim 1, wherein Δ2/Δ1<−0.3 is formed when a relative refractive index difference of the second layer is set to Δ2.

3. An optical fiber according to claim 1, wherein Δ2 is −0.45% or more and −0.30% or less, and Δ3 is 0.10% or more and 0.30% or less when a relative refractive index difference of the second layer is set to Δ2 and a relative refractive index difference of the third layer is set to Δ3.

4. An optical fiber according to claim 3, wherein the refractive index profile structure is a four-layer structure, and 1.6≦b/a≦2.0 and 2.1≦c/a≦3.2 are formed when an outside diameter of the first layer is set to a, an outside diameter of the second layer is set to b and an outside diameter of the third layer is set to c.

5. An optical fiber according to claim 3, wherein the refractive index profile structure is a fifth-layer structure, and the refractive index of a fourth layer is set to be lower than that of the third layer.

6. An optical fiber according to claim 5, wherein a relative refractive index difference of the fourth layer is 0.05% or more and 0.15% or less.

7. An optical fiber according to claim 5, wherein a relative refractive index difference of the fourth layer is −0.15% or more and −0.05% or less.

8. An optical fiber according to claim 6, wherein a:b:c:d= 1:(1.6 to 2.2):(2.3 to 2.8):(2.8 to 4.3) is formed when an outside diameter of the first layer is set to a, an outside diameter of the second layer is set to b, an outside diameter of the third layer is set to c and an outside diameter of the fourth layer is set to d.

9. An optical fiber according to claim 7, wherein a:b:c:d= 1:(1.6 to 2.2):(2.3 to 2.8):(2.8 to 4.3) is formed when an outside diameter of the first layer is set to a, an outside diameter of the second layer is set to b, an outside diameter of the third layer is set to c and an outside diameter of the fourth layer is set to d.

10. An optical fiber according to claim 1, wherein polarization mode dispersion is 0.10 ps/km$^{1/2}$ or less, and bending loss at a diameter of 20 mmϕ is 20 dB/m or less, and transmission loss is 0.24 dB/km or less at a wavelength of 1550 nm.

11. An optical fiber according to claim 1, wherein a value (dispersion/dispersion slope) provided by dividing dispersion by a dispersion slope in at least one portion within the wavelength range from 1500 nm to 1650 nm is 200 or more and 400 or less.

12. An optical transmission line constructed by including one or more optical fibers having positive dispersion and a positive dispersion slope in at least one portion of a wavelength band within a wavelength range from 1500 nm to 1650 nm, and one or more optical fibers having negative dispersion and a negative dispersion slope in said one portion of the wavelength band, wherein the optical fiber having said negative dispersion and the negative dispersion slope includes the optical fiber according to claim 1.

* * * * *